United States Patent [19]

Blankenship et al.

[11] Patent Number: 4,825,923
[45] Date of Patent: May 2, 1989

[54] TRACTION CABLE

[75] Inventors: David J. Blankenship; Richard A. George; Steven E. Czaplewski, all of Winona, Minn.

[73] Assignee: Peerless Chain Company, Winona, Minn.

[21] Appl. No.: 96,641

[22] Filed: Sep. 11, 1987

[51] Int. Cl.$^4$ ............................................. B60C 27/06
[52] U.S. Cl. ..................... 152/213 A; 24/129 R; 152/219; 152/222; 403/279
[58] Field of Search ............... 156/213 R, 208, 213 A, 156/216–222, 231–233, 239, 240, 241, 242; 403/274, 279, 284, 285, 405.1; 24/136 L, 16, 129 W, 129 R

[56] References Cited

U.S. PATENT DOCUMENTS

| | | | |
|---|---|---|---|
| 681,173 | 8/1901 | Maxim et al. | 152/221 |
| 1,242,238 | 10/1917 | Proulx | 152/208 |
| 1,267,544 | 5/1918 | Haubner | 152/208 |
| 1,301,988 | 4/1919 | Weber | 24/115 R |
| 1,346,226 | 7/1920 | Mager | 152/222 |
| 1,802,653 | 4/1931 | Kalebdjan | 152/225 R |
| 2,252,027 | 8/1941 | Pasquarella, Jr. | 152/221 X |
| 2,589,207 | 3/1952 | Welsh, Jr. | 152/225 R |
| 2,685,903 | 8/1954 | Lutey | 152/222 |
| 2,693,838 | 11/1954 | Danchurand et al. | 152/225 R |
| 2,714,914 | 8/1955 | Champigny | 152/222 |
| 2,788,049 | 4/1957 | Canepa | 152/239 |
| 2,792,867 | 5/1957 | Basile | 152/219 |
| 2,931,413 | 4/1960 | Randall | 152/219 |
| 3,144,068 | 8/1964 | Campbell, Jr. | 152/245 |
| 3,752,204 | 8/1973 | Ouellette | 152/219 |
| 3,796,461 | 3/1974 | Cucheran et al. | 297/483 |
| 3,828,550 | 8/1974 | Fink | 59/85 |
| 3,856,069 | 12/1974 | Giannone | 152/217 |
| 3,857,428 | 12/1974 | Dolphin | 152/241 |
| 3,895,419 | 7/1975 | Roberts | 24/230.5 R |
| 3,899,873 | 8/1975 | Fink | 59/85 |
| 4,010,501 | 3/1977 | Cooke | 441/118 |
| 4,107,917 | 8/1978 | Fink | 59/85 |
| 4,111,251 | 9/1978 | Bula | 152/219 |
| 4,155,389 | 5/1979 | Dwinell | 152/221 |
| 4,174,981 | 11/1979 | Cassell | 148/12 B |
| 4,263,954 | 4/1981 | Dwinell | 152/222 |
| 4,280,545 | 7/1981 | Martinelli | 152/222 |
| 4,308,906 | 1/1982 | Bula et al. | 152/219 |
| 4,321,956 | 3/1982 | Martinelli | 152/222 |
| 4,366,849 | 1/1983 | Martinelli | 152/221 |
| 4,366,850 | 1/1983 | Coutts | 152/222 |
| 4,378,040 | 3/1983 | Howell | 152/213 A |
| 4,396,184 | 8/1983 | Coutts | 269/41 |
| 4,436,129 | 3/1984 | Razza | 152/213 A |
| 4,457,131 | 7/1984 | Coutts | 59/35.1 |
| 4,568,394 | 2/1986 | Cassell | 148/12 B |
| 4,569,190 | 2/1986 | Gilmore | 57/201 |
| 4,615,368 | 10/1986 | Nestlen | 152/213 A |

FOREIGN PATENT DOCUMENTS 543421 5/1956 Italy .
352718 4/1961 Switzerland .

Primary Examiner—Michael W. Ball
Assistant Examiner—Thomas Bokan
Attorney, Agent, or Firm—Merchant, Gould, Smith, Edell, Welter & Schmidt

[57] ABSTRACT

A traction cable is provided for use on a vehicle tire to increase traction in snow and ice. The traction cable comprises a pair of elongated flexible side members having first and second ends, a plurality of flexible cross members interconnecting the side members, a transverse connector mechanism for transversely connecting the ends of the cross members to the side members, and a releasable connector mechanism for releasably connecting the first and second ends of each of the side members. The cross members have ends and each of the cross members includes a cable having a plurality of traction elements slidably and rotatably mounted thereon. Each of the traction elements define a plurality of edges. The releasable connector mechanism includes first and second metal stampings which are preferably identical, a metal ring, and a flexible strap having first and second ends. A metal stamping is also provided which may be deformed in different manners into one of at least two configuration, each configuration contributing to the releasable connector mechanism. A method of making a releasable connector mechanism receiving a flexible strap to interconnect ends of a lateral side member of a traction cable is also provided. A side cable clip for transversely interconnecting members of a traction cable, and a method of making such a side cable clip are also provided.

1 Claim, 2 Drawing Sheets

TRACTION CABLE

BACKGROUND OF THE INVENTION

The present invention relates to a traction apparatus and more particularly to a traction cable for vehicle tires having cross members extending between two lateral side members. These devices are commonly used to provide traction for motorized vehicles traveling on snowy or icy surfaces.

Tire traction cables having a pluraltiy of cross members and lateral members made of cable are well known in the art. Martinelli (U.S. Pat. No. 4,321,956) disclose that traction devices utilizing lightweight cable are desirable because they require less clearance between the tire and the fender walls than conventional tire chains, and because they adapt to the variation in shape or flexing which a tire undergoes when subjected to a load.

As further discussed in the Martinelli patent, which discloses a belt attachment for a tire traction apparatus, it is important to secure a tire traction cable apparatus to a tire as tightly as possible to avoid any slack in either the cross members or the lateral side members so that the cable does not rub on the vehicle when in use. Consequently, it is important that traction cable be easy to install and adjust. Therefore, fastening means are required which do not contribute substantially to the weight or the looseness of the traction cable, and which facilitate installation and removal even under adverse conditions.

Additionally, it is important that the traction cable provide sufficient traction without increasing the bulkiness thereof. In an attempt to increase traction without adding substantially to bulk, traction elements have been added to the cross members. Dwinell (U.S. Pat. No. 4,155,389) discloses anti-skid traction sleeves attached to a plurality of crossmembers which are bound to two lateral members. The purpose of the traction elements is to increase the number of edges which bite or engage the ice and snow.

The present invention provides for improved means for attaching a traction cable to a tire and provides for improved traction means. It also provides improved means for attaching the cross members to the lateral side members. Furthermore the present invention offers other advantages over the prior art and solves other problems associated with the prior art.

SUMMARY OF THE INVENTION

The present invention relates to a traction cable for use on a vehicle tire to provide increased traction in snow and ice, wherein the tire includes two opposite side walls and a tread portion interposed between and adjacent to the opposite side walls. The traction cable comprises: a pair of elongated flexible lateral side members having first and second ends; a plurality of flexible cross members interconnecting the side members; transverse connector-means for transversely connecting the ends of the cross members to the side members; and releasable connector means for releasably connecting the first and second ends of each of the side members. The cross members have ends and include a cable having a plurality of traction elements slideably and rotatably mounted thereon. Each of the traction elements defines a plurality of edges. The releasable connector means includes first and second metal stampings, a metal ring, and a flexible strap having first and second ends. The first metal stamping is deformed around the first end of the flexible strap such that the strap is fixedly bound in the deformed metal stamping. The second metal stamping is deformed to receive and rotatably retain the metal ring, such that the second metal stamping and the metal ring cooperate to form a self-locking strap fastener which receives and fastens the second end of the strap. The second end of the strap is releasably fastened when engaged in the self-locking strap fastener. The traction cable may receive and be removably bound around the tire, wherein the releasable connector means releasably connects the first and second ends of the elongated flexible side members, such that the side members extend circumferentially around opposite side walls of the tire. The flexible cross members interconnecting the side members extend over and across the tread portion, wherein the traction cable provides increased traction in snow and ice.

Preferably the transverse connector means include a plurality of side cable clips, each of which include an upper surface, first binding means for binding the end of a cross member, and second binding means for binding transversely to a side member. The first binding means preferably include at least two circular protrusions and a plurality of displacement teeth. The circular protrusions protrude above the upper surface of the side cable clips and cooperate with the displacement teeth to displace the cross member from a linear path through the first binding means. Preferably, the traction elements include an elongated coil member having a coiled spring-like configuration. In addition, the first and second metal stampings are preferably substantially identical, substantially flat metal plates prior to being deformed.

The releasable connector means preferably includes a releasable connector apparatus which releasable interconnects first and second ends of the side members. The connector apparatus preferably includes the flexible strap; a strap binder including a body portion first and second side portions and first and second end portions; and the self-locking strap fastener. The strap fastener include the metal ring, a body portion, a first and second end portions, and first and second side portions. The first end portion has a serrated edge and the side portions have shoulders extending transversely of the body portion. The first end portion is deformed such that the serrated edge extends upward from and transversely of the body portion. The side portions are deformed such that the shoulders extend upward from and transversely of the body portion. Each of the shoulders have a recess extending away from the first end portion and these recesses cooperate to receive and rotatably retain the metal ring. The second end portion is crimped circumferentially around the second end of the side member such that the end of the side member is fixedly bound therein. The second end portion of the strap binder is crimped circumferentially around the first end of the side member such that the end of the side member is fixedly bound therein. The side portions of the strap binder also has shoulders extending transversely of the body portion. The strap binder receives the first end of the strap and the side portions are deformed such that the shoulders are crimped down upon the first end of the strap, thereby fixedly binding the strap between the shoulders and the body portion. The strap fastener can releasably bind the second end of the strap where the second end of the strap is threaded through the ring and engaged to the serrated edge of the first portion, thereby releasably interconnecting the first and second ends of the side member.

The present invention further provides a metal stamping to be deformed in different manners into one of at least two configurations. In a first configuration the metal stamping receives and fixedly binds an end of an elongated flexible side member of a traction cable, and receives and rotatably retains a metal ring. In a second configuration the metal stamping receives and fixedly retains an end of a flexible strap having first and second ends, and receives and fixedly binds an opposite end of the elongated flexible side member. The first and second configurations form opposite ends of a releasable connector apparatus interconnecting the ends of the side member. The metal stamping includes a substantially flat metal plate having a body portion, first and second end portions, and first and second side portions. The first end portion has a serrated edge. The first and second side portions are substantially mirror images of each other, each having a shoulder extending transversely of the body portion. Each of the shoulders have a recess which extends substantially away from the first end portion. The stamping can be deformed into the first configurations such that the second end portion is crimped circumferentially around the second end of the side member to fixedly bind the side member therein, and such that the first and second side shoulders form opposite sides of a self-locking strap fastener which fastens the second end of the strap. The first and second side shoulder recesses receive and rotatably retain the metal ring. The stamping is deformed such that the serrated edge of the first end portion can cooperate with the metal ring to releasably bind the strap when the second end of the strap is threaded through the ring and subsequently comes to rest against the serrated edge. The stamping can also be deformed into the second configuration such that the first and second side shoulders fixedly bind the first end of the strap between the shoulders and the body portion and so that the second end portion can be crimped circumferentially around the end of the side member to fixedly bind the side member therein.

The releasable connector mechanism of the present invention is particularly advantageous in that it allows the traction cable to easily bound around a vehicle tire. The strap may be easily threaded through the ring of the self-locking strap fastener in order to fasten the strap. The fact that a single metal stamping may be used in making the devices at both ends of the flexible side member allows the traction cable to be manufactured inexpensively because fewer pieces are required to assemble the entire apparatus. Because of the design of the various parts of the present traction cable, the preferred embodiment can be assembled on a fully automated assembly line. This provides a significant advantage over other competing products with respect to cost.

Another advantage of the present invention is the design of the transverse connector mechanism for transversely connecting the ends of the cross members to the side members. In this context "transversely connecting" means connecting the ends of the cross members to the side members such that the cross members are substantially perpendicular to the side members. "Transversely" means perpendicular to, or extending away from in a manner which is perpendicular to, a particular member. A particular advantage of this connecting mechanism is the method for binding the end of the cross member which is preferably plastic or nylon coated. Since the end of the cross member is not allowed to follow a linear path through the binding mechanism, it is bound more securely than if it were otherwise bound, thereby allowing the use of a plastic coated cable which might otherwise slip out of a less secure binding.

A further advantage of the present invention is its ability to withstand wear and provide for longevity of use, not only of the traction cable and the traction elements, but other parts of the traction cable as well.

The above described features and advantages, along with various other advantages and features of novelty are pointed out with particularity in the claims of the present application. However, for a better understanding of the invention, its advantages, and objects obtained by its use, references should be made to the drawings which form a further part of the present application and to the accompanying descriptive matter in which there is illustrated and described perferred embodiments of the invention.

BRIEF DESCRIPTION OF THE DRAWINGS

In the drawings, in which like reference numerals and letters indicate corresponding parts throughout the several views.

DETAILED DESCRIPTION OF PREFERRED EMBODIMENTS

Figure 1:
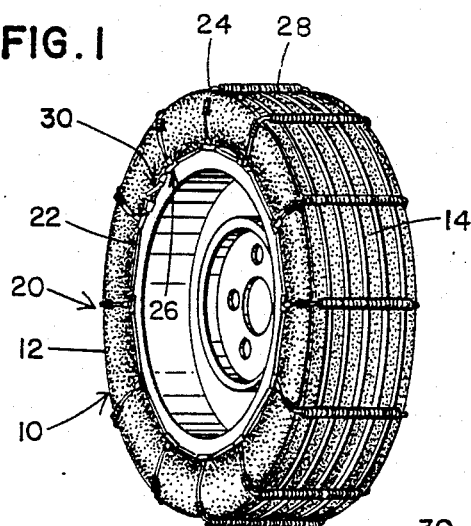
FIG. 1 is a perspective view of a vehicle tire equipped with a traction cable made in accordance with the present invention.
Figure 7:
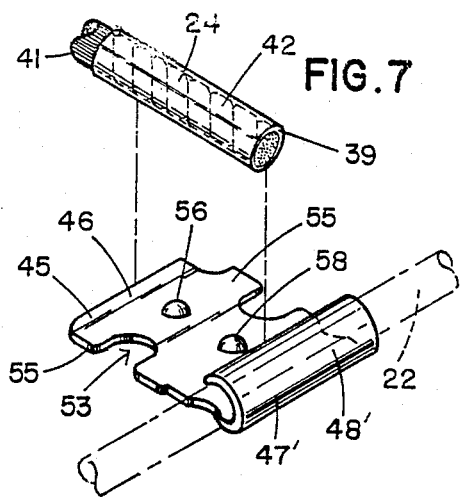
FIG. 7 is a top view of a side cable clip prior to being circumferentially crimped up to bind the end of a cross member, a lateral side member being shown in phantom.
Figure 2:
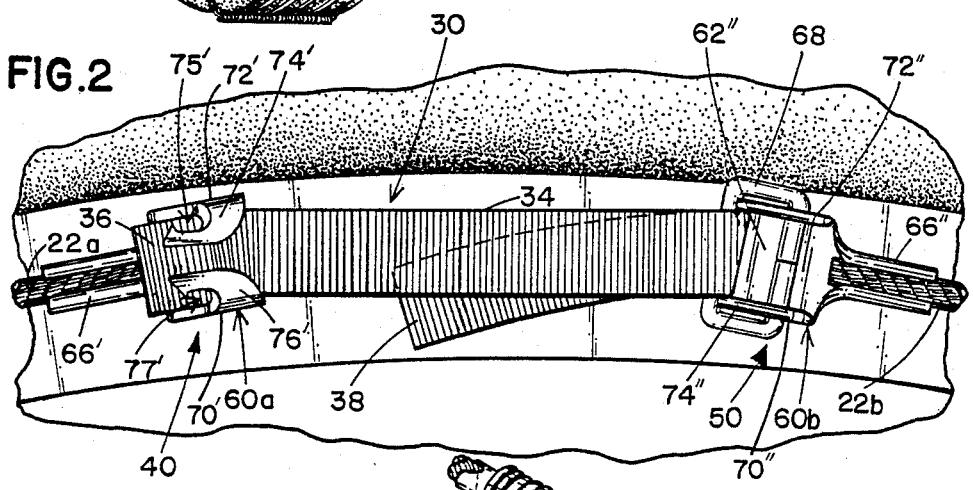
FIG. 2 is an exploited perspective view of parts of the traction cable shown in FIG. 1, including a releasable connector mechanism.
Figure 3:
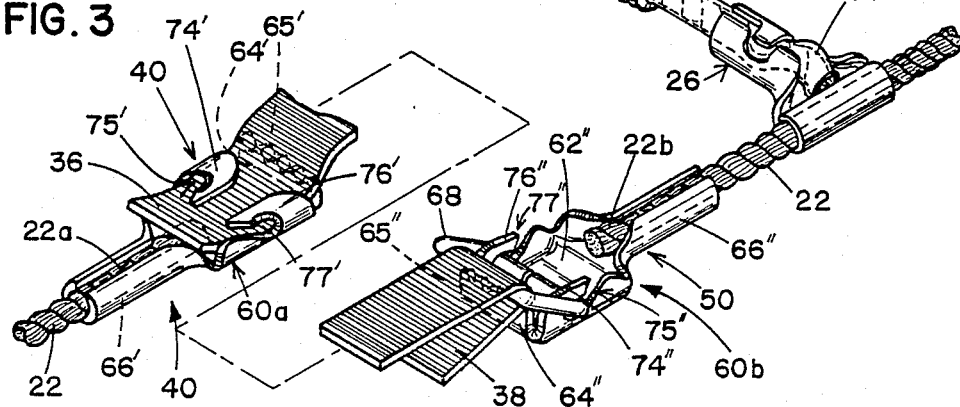
FIG. 3 is an exploited perspective view of parts of the traction cable shown in FIG. 1, including a self-locking strap fastener, a strap binder, traction elements, and a side cable clip.
Figure 5:
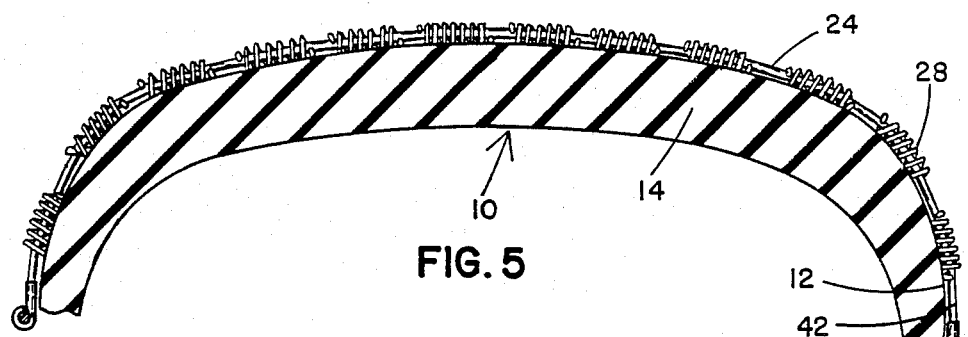
FIG. 5 is a cross-sectional view of a vehicle tire showing a cross member interconnecting the lateral side members, and with traction elements mounted thereon.

Referring now to the drawings, there is illustrated in FIG. 1 a preferred embodiment of the traction cable of the present invention generally designated by the reference numeral 20. The traction cable of the present invention includes two elongated, flexible lateral side members 22 which extend circumferentially about opposite side walls 12 of a vehicle tire 10. The side members 22 are interconnected by a plurality of flexible cross members 24 which extend over and across a tread portion 14 of a tire 10 when the traction cable 20 is bound around a vehicle tire 10. Referring now also to FIGS. 2 and 3, ends 42 of the cross members 24 are transversely connected to the lateral side members 22 with side cable clips 26. Ends 22a and 22b of the side members 22 are releasably connected by a releasable connector mechanism generally designated by the reference numeral 30. A plurality of traction elements 28 are slideably and rotatably mounted on the cross members 24. The traction elements 28 are positioned on the cross members to provide added traction, preferably in snow and ice.

As illustrated particularly in FIGS. 2 and 3, the lateral side members 22 in the preferred embodiment are made of a cable, preferably cable made of a plurality of metal wires. In alternative embodiments the side member may be made of other types of cables including plastic coated cables, single strands of wire, armor wrapped cable, plain cable, wire rope and the like. Likewise, the cross member 24 may be made of any kind of cable or wire generally known in the art, however, in the preferred embodiment illustrated in the drawings the cross member 24 includes a wire cable similar to that included in the side member 22, but which is plastic coated, preferably nylon coated to provide greater wear. The side member 22 has first and second ends 22a and 22b respectively. The releasable connector mechanism 30 releasably connects the first and second ends 22a and 22b of each lateral side member 22, thereby binding the traction cable 20 around the vehicle tire 10.

The releasable connector mechanism 30 of the preferred embodiment includes a flexible strap 34 having first and second ends 36 and 38, a strap binder 40, and a self-locking strap fastener generally referred to by the reference numeral 50 The flexible strap 34 may be any strap generally known in the art. In the preferred embodiment the strap 34 is a woven strap made of a synthetic fiber, preferably nylon. The strap binder 40 and the self-locking strap fastener 50 are made by a process which includes deforming identical metal stampings 60 (illustrated in FIG. 4) which are deformed into a first 60b and second configuration 60a which correspond to the configurations which the metal stamping 60 is deformed to assume in the self-locking strap fastener 50 and the strap binder 40 respectively. substantially flat metal plate 61 having a body portion 62. first and second end portions 64 and 66, and first and second side portions 70 and 72. The first end portion 64 has a serrated edge 65. The first and second side portions 70 and 72 are substantially mirror images of one another, and each has shoulders 74 and 76 extending transversely of and away from the body portion 62. Each of the shoulders 74 and 76 have a recess 75 and 77 which extend substantially away from the first end portion 64. The flat metal plate 61 is preferably made of a relatively soft metal having a relatively low carbon content which allows it to be easily deformed.

The strap binder 40 includes elements corresponding to the elements of the metal plate 61 which is deformed into the second configuration 60a to form the strap binder 40. The elements of the strap binder 40 which correspond to elements of the metal plate 61 will be designated by primed numerals corresponding to the numerals designating the corresponding elements of the metal plate 61. Elements, of the strap binder 40 include a body portion 62' (not shown), first and second side portions 70' and 72' adjacent to and extending for opposite sides of the body portion, and first and second end portions 64' and 66' adjacent to and extending from opposite ends of the body portion. The first end portion 64' is deformed such that the serrated edge 65' extends upward from and transversely of the body portion 62'.

The second end portion 66' is crimped circumferentially around the first end 22a of the side member 22 such that the end 22a of the side member 22 is fixedly bound therein. The side portions 70' and 72' have shoulders 74' and 76'. The strap binder 40 receives the first end 36 of the strap 34 from the direction of the first end portion and the strap overlapping at least a portion of the body portion and the side portions 70' and 72' are deformed such that the shoulders 74' and 76' are crimped down upon the first end 36 of the strap 34, thereby fixedly binding the strap 34 between the shoulders 74' and 76' and the body portion 62'.

The self-locking strap fastener 50 includes the metal ring 68 and elements corresponding to elements of the metal plate 61 which is deformed to become a part of the strap fastener 50. The elements of the strap fastener 50 which correspond to elements of the metal plate 60a are designated by double primed numerals corresponding to the numerals for the corresponding elements of the metal plate 60a. These elements include a body portion 62", first and second end portions 64" and 66" adjacent to and extending for opposite sides of the body portion, and first and second side portions 70" and 72" adjacent to and extending for opposite sides of the body portion. The first end portion 64" has a serrated edge 65". The side portions 70" and 72" have shoulders extending transversely of the body portion 62". The first end portion 64" is deformed such that the serrated edge 65" extends upward from and transversely of a surface of the body portion 62". The side portions 70" and 72" are deformed such that the shoulders 74" and 76" extend upward from and transversely of the surface of the body portion 62". The recesses 75" and 77" cooperate to receive and rotatably retain a metal ring 68. The second end portion 66" is crimped circumferentially around the second end 22b of the side member 22 such that the end 22b of the side member 22 is fixedly bound therein.

A preferred method of making the releasable connector mechanism 30 for receiving the flexible strap 34 to interconnect the first and second ends 22a and 22b of the lateral side members 22 of the preferred embodiment of the traction cable 20 comprises the following steps. Making metal stampings 60 which are substantially identical. The stampings 60 are preferably made of a substantially soft, substantially flat metal plate 60a as described above. To form the strap binder 40, a metal stamping 60 is deformed such that the first and second side shoulders 74' and 76' fixedly bind the first end 36 of the strap 34 between the first and second side shoulders 74' and 76' and the body portion 62'. The second end portion 66' of the stamping 60 is crimped circumferentially around the first end 22a of the side member 22, thereby binding the first end 22a of the side member 22 therein. To form the self-locking strap fastener 50 another metal stamping 60 is deformed such that the serrated edge 65" extends transversely of and upward from the body portion 62", and such that the shoulders 74" and 76" extend transversely of and upward from the body portion 62". The stamping 60 is further deformed such that the second end 66" is crimped circumferentially around the second end 22b of the side member 22, thereby binding the second end 22b of the side member 22 therein. A metal ring 68 is punched into the recesses 75" and 77" such that the recesses 75" and 77" receive and rotatably retain the metal ring 68. When the process of making the releasable connector mechanism 30 is completed, the second end 38 of the strap 34 can be threaded through the metal ring 68 and subsequently engaged to the serrated edge 65" such that the strap 34 is releasably bound, thereby interconnecting the first and second ends 22a and 22b of the side member 22.

The releasable connector mechanism 30 has a self-locking feature which results from the cooperation between the ring 68 and the serrated edge 65" to bind the strap 34. In order to releasably bind the strap 34, the second end 38 of the strap 34 is passed over the ring 68 and then passed through the ring 68 such that the strap 34 comes into contact with the serrated edge 65" when the strap 34 is pulled tight, thereby shortening the distance between the ring 68 and the strap binder 40. If the strap 34 is passed through the ring 68 in a different manner, the strap 34 will not be bound in the self-locking strap fastener 50. This will be obvious to the person putting the traction cable 20 on the tire 10. When the strap 34 is properly inserted in the ring 68 and the strap 34 is pulled tight, the metal ring forces the body portion 62" out of the plane with the side member 22. This increases the pressure of the serrated edge 65" on the strap 34, thereby locking the strap 34 in place. As the tension on the strap 34 and the side member 22 are increased, the serrated edge 65" is pressed against the strap 34 with increasing force. This causes a tighter grip on the strap 34. Therefore, the tighter the tension on the strap 34, the tighter the grip on the strap 34 by the strap fastener 50.

The releasable connector mechanism 30 preferably utilizes the same metal stamping 60 at both ends of the side member 22. The recesses 75 and 77 in the metal stamping 60 are designed to function in three ways. First, to allow the metal ring 68 to be inserted into the second configuration 60b from one side and in one direction to form the strap fastener 50, thus allowing the ring to be inserted by an automated or semi-automated machine. Second, the metal ring 68 actually snaps into place, such that the metal ring is rotatably retained in place within the recesses 75" and 77" of the self-locking strap fastener 50. Third, the recesses 75' and 77' of the strap binder 40 allow material from the strap 34 to be forced up into them when the side portions 70' and 72' of the strap binder 40 are crimped down upon the strap 34, thereby increasing the grip upon the strap 34.

Referring now to FIGS. 5, 6, 7, and 8, the cross member 24 is preferably a plastic 39 coated cable 41 whose ends 42 are bound in side cable clips 26 which connect the cross members 24 transversely to the side members 22, thereby interconnecting the side members which extend circumferentially around opposite side walls 12 of a vehicle tire 10 when installed thereon. A plurality of traction elements 28 are preferably slideably and rotatably mounted on the cross members 24. The traction elements 28 are preferably made from coiled wire which can be made by automated machines. Each coiled traction element 28 has many tractive edges which increase the tractive force of the traction cable 20. Each of the traction elements or roller components 28 preferably have a plurality of edges for engaging the ice and snow, more preferably about the circumference thereof. Most preferably the traction elements 28 have a coiled spring configuration with a plurality of windings or coils which are spaced apart from each other to provide a plurality of edges for engaging the ground and biting into ice or hard packed snow surfaces. In addition, contact pressure per square inch of traction elements 28 is increased over a solid roller or a traction element as disclosed in U.S. Pat. No. 4,155,389. Consequently, overall traction performance is increased. In certain applications, the applicant has found oil tempered steel having a square or rectangular cross-section to be particularly efficient. A square or rectangular cross-section provides sharp edges for biting into the ice and also provides exposure of sufficient surface to the ground so as to reduce wear. In other applications it has been found to be more desireable to use oil tempered steel having round or rounded cross-section, because, although still providing effective traction, it is more cost effective and is less likely to wear the tire.

The traction elements 28 are rotatably and slidably mounted on the elongated cross members 24, the inner diameter of the traction elements being greater than the outer diameter of the elongated cross members 24 and there being fewer traction elements 28 in each elongated cross member 24 than required to extend the entire length thereof. Thus, the traction elements 28 are free to rotate so as to expose all sides of the traction elements 28 to the ground over a period of use thereby increasing useful life. Furthermore, the traction elements 28 are able to move longitudinally of the elongated cross members 24 which assists in preventing the traction elements 28 from locking onto each other and allows the passage of snow and ice chunks between adjacent traction elements. Furthermore, the rotatability and slidability of the traction elements 28 enables a better fit of the cable tire chain to the tire.

The coiled spring-like configuration of the traction elements 28 provides for flexing over varying tire tread designs and varying road surface conditions and additionally, provides enhanced shock absorption characteristics.

It will be appreciated that the traction elements may include a hollow elongated cylindrical member defining a plurality of evenly spaced alternating grooves and ridges about the circumference thereof. The alternating grooves and ridges define a plurality of edges for cutting into the ice and snow. In some embodiments, the traction elements might be made by an injection molded plastic process.

As the traction element 28 wears, the tractive force does not noticeably diminish, whereas other types of tractive elements becomes much less effective over a short period of use. Allowing the traction elements 28 to rotate on the cross member greatly increases the life of the traction cable 20. The traction cable 20 lasts longer than other similar devices because of the following additional features inherent to the coiled wire design. As the coiled wire wears, the coil breaks into washers, or smaller coils, which continue to rotate on the cross cable. After further wear they break into smaller pieces and simply fall off. Other similar devices used tubular elements which wears and flattens the cable. When this happens, the element can no longer rotate on the cross cable. This causes the cross cable to break prematurely, thereby destroying the traction device. Another feature of the preferred embodiment of the present invention is that when the cross member does finally break, the elements which are left on the cross cable fall off. This greatly reduces the risk of damage to the automobile because only the cable end is loose. If the cable end included tubular elements they might repeatedly strike the automobile as the tire revolves.

Figure 6:
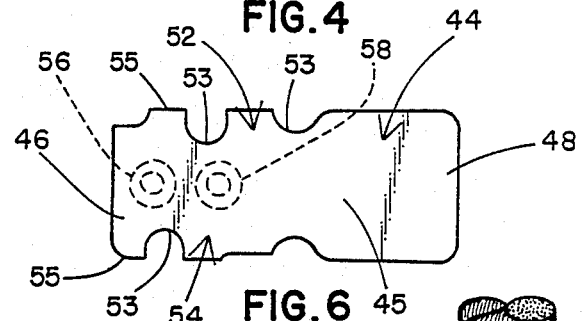
FIG. 6 is a top view of a flat metal piece used to form a side cable clip showing the location where the circular protrusions will eventually be located in phantom.
Figure 8:
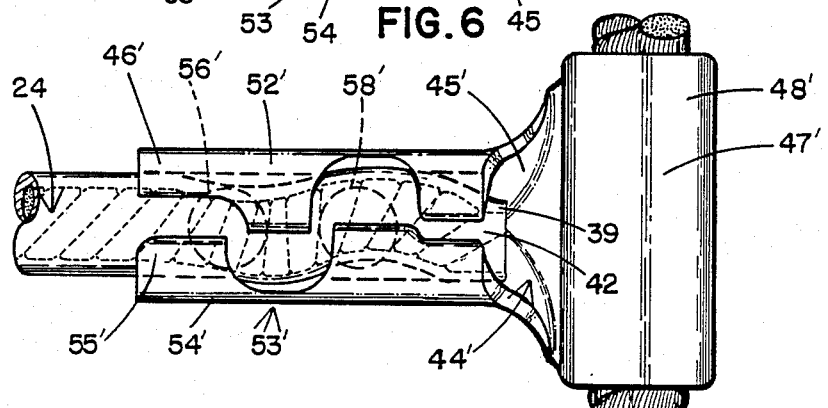
FIG. 8 is an enlarged top view of a side cable clip showing circular protrusions and an end of a cross member wholly or partially in phantom.

The side cable clips 26 are preferably made from a flat metal piece 44, which is illustrated in FIG. 6. The flat metal piece 44 is preferably made from a relatively soft metal similar to the metal used to make the metal stampings 60. Preferably, this metal is a plain carbon steel having a carbon content of about 0.01–0.40%, most preferably about 0.05–0.20%. The most preferred embodiment employs steel having about 0.08% carbon content. This makes it easier to deform and crimp the metal piece 44 and the metal stamping 60. The side cable clip 26 is designed to be automatically assembled by automated machines. The unique shape allows the side cable clip 26 to work equally well in cooperation with cross members made of plastic or nylon coated cables, armor wrapped cable, plain cable, wire rope, single metal strands, and the like. The design of the side cable clip 26 is particularly important with respect to binding the preferred plastic or nylon coated cable which may otherwise slip out of similar devices because of its resilient surface.

The side cable clips 26 of the present invention are preferably formed by deforming the flat metal piece 44. This piece 44 includes first and second ends 46 and 48, first and second sides 52 and 54 having a plurality of recesses 53 defining a plurality of displacement teeth 55. The flat metal piece also has upper and lower surfaces 45 and 47. The side cable clip 26 is made by a process including the steps of making the flat metal piece 44, punching two indentations into the lower surface 47 of the metal piece 44 such that first and second circular protrusions 56 and 58 are created on the upper surface 45. The metal piece 44 is also deformed such that the first end 46 is crimped circumferentially around the end 42 of the cross member 24 thereby fixedly binding the end 42 of the cross member 24 therein. The displacement teeth 55 and the circular protrusions 56 and 58 cooperate to displace the cross member 24 from a linear path within the first end 46 of the metal piece 44 which becomes the first end 46' of the side cable clip 26. The metal piece 44 is also deformed such that the second end 48' is crimped circumferentially around the side member 22 and transversely to the cross member 24, such that the side member 22 is fixedly bound therein. The side cable clip 26 includes many elements which correspond to elements of the flat metal piece 44 which is deformed to make the side cable clip 26. These corresponding elements have been designated with primed numerals which correspond to the numerals of the corresponding elements of the flat metal piece 44. The side cable clip 26 comprises a body portion 44' which corresponds to the flat metal piece 44 which is deformed to make the side cable clip 26. The body portion 44' includes first and second ends 46' and 48', upper and lower surfaces 45' and 47', first and second sides 52' and 54' having a plurality of recesses 53', and at least two circular protrusions 56' and 58' extending above the upper surface 45' of the body portion 44'. The recesses 53' define a plurality of displacement teeth 55'. The first end 46' of the body portion 44' is crimped circumferentially around the end 42 of the cross member 24 such that the end 42 of the cross member 24 is fixedly bound therein. The displacement teeth 53' and the circular protrusions 56 and 58 cooperate to displace the cross member 24 from a linear path within the first end 46'. The second end 48' of the body portion 44' is crimped circumferentially around the side member 22 and transversely to the cross member 24 such that the side member 22 is fixedly bound therein. In this way the cross members 24 are transversely connected to the side members 22 which are thereby interconnected.

The side cable clip 26 is designed to be deformed by automated or semi-automated machines. The unique shape allows the side cable slip 26 to work equally well on plastic or nylon coated cables, armor wrapped cable, plain cable, wire rope, singe wire strands, and the like. The cooperation of the displacement teeth 55' and the circular protrusions 56 and 58, which displace the cross member 24 from a linear path within the binding mechanism of the first end 46' of the side cable clip 26, allows plastic or nylon coated cables to be bound especially well. Since the cable is forced to go around the circular protrusions 56 and 58 to at least some degree, when a pulling force is exerted on the cable it will be directed against the rise of the circular protrusions and edges of the displacement teeth. This will restrict the cable, thereby requiring a greater force to pull the cable out of the side cable clip 26 than might otherwise be required. This is especially advantageous in order to effectively bind plastic or nylon coated cable which might otherwise slip out of the crimped clip 26.

An additional advantage of the traction cable 20 of the preferred embodiment of the present invention is that the releasable connector mechanism allows the traction cable 20 to be bound around or installed upon a range of tires with roughly similar tire sized. The strap 34 may be adjusted to tighten the side members 22. Because the strap 34 can have virtually any practical length, preferably about 25–35 centimeters, the adjustment may be substantial. Such a potential adjustment allows the preferred traction cable 20 to be very versatile in that it can be used on many tires having different sizes. This can be particularly important because the actual tire dimensions may vary from one tire manufacturer to another, even within the same stated tire ranges. The releasable connector mechanism 30 allows an infinite adjustment within the range of the length of the strap 34. If the strap is adjusted so that a substantial portion of the strap 34 is pulled through the ring 68 and is free of the strap fastener 50, the strap 34 may be tied around itself, particularly the portion of the strap 34 upon which tension has been placed in order to tighten the side member 22 around the side wall 12 of the tire 10. This will keep the free ends of the straps 34 from flapping around freely on the sides of the tire 10.

Preferably, the traction cable 20 of the present invention is installed on a vehicle tire 10 so that the smooth side of the elements of the releasably connector mechanism 30 and the smooth side of the side cable clips 26 face the side walls 12 of the tire 10. This prevents damage to the tire 10 by the many edges on the reverse side of these elements. At the same time, the side cable clip 26, the strap binder 40 and the strap fastener 50 of the preferred embodiment are designed to prevent injury to installers and others exposed to the ends of the various cables. The side cable clip 26 is designed to provide a space for the end 42 of cross member 24 to fall into which is somewhat recessed from the sides 52' and 54' of the clip 26. A similar relationship exist between the strap fastener 50 and the end 22b of the lateral side member 22. The other end 22a of the side member 22 bound in the strap binder 40 is covered by the first end 36 of the strap 34. These features prevent injuries which might otherwise occur due to the presence of sharp metal ends of the wires which comprise many types of cable.

It will be appreciated that the present invention provides a traction apparatus which is simply and quickly installed or removed. It will further be appreciated that the present invention will prevent accidental loosening once installed and will provide a long useful life. Furthermore, the present invention is easy to repair and provides for improved traction.

It is to be understood, however, that even though these numerous characteristics and advantages of the invention have been set forth in the foregoing description, together with details of the structure and function of the invention, the disclosure is illustrative only, and changes may be made in detail, especially in matters of shape, size and arrangement of parts within the principle of the invention to the full extent indicated by the broad general meaning of the terms in which the appendent claims are expressed.

What is claimed is:

1. A tire traction device comprising releasable connector mechanism for releasably interconnecting first and second ends of a side member of a traction cable mounted on a lateral side wall of a vehicle tire, said connector mechanism comprising:
   (a) a flexible strap having first and second ends;
   (b) a strap binding including a body portion, first and second side portions adjacent to and extending from opposite sides of said body portion, and first and second end portions adjacent to and extending from opposite ends of said body portion; said second end portion being crimped circumferentially around the first end of the side member such that the end of the side member is fixedly bound therein; each of said side portions having a shoulder extending transversely of said body portion; said strap binder receiving said first end of said strap from the direction of the first end portion and said strap overlapping at least a portion of the body portion; said side portions being deformed such that said shoulders are crimped down upon the first end of said strap, thereby fixedly binding the strap between said shoulders and said body portion; and
   (c) a self-locking strap fastener including a metal ring, a body portion, first and second end portions adjacent to and extending from opposite ends of said body portion, and first and second side portions adjacent to and extending from opposite sides of said body portion; said first end portion having a serrated edge; said side portions having shoulders extending transversely of said body portion; said first end portion being deformed such that said serrated edge extends upward from and transversely of a surface of said body portion; said side portions being deformed such that said shoulders extend upward from and transversely of the surface of said body portion; each of said shoulders having a recess extending away from said first end portion; said recesses cooperating to receive and rotatably retain said metal ring; said second end portion being crimped circumferentially around the second end of the side member such that the end of the side member is fixedly bound therein; wherein said strap fastener can releasably bind the second end of the strap when the second end of the strap is threaded through the ring and engaged to the serrated edge of the first end portion, thereby releasably interconnecting the first and second ends of the side member.

* * * * *

UNITED STATES PATENT AND TRADEMARK OFFICE
CERTIFICATE OF CORRECTION

PATENT NO. : 4,825,923

DATED : May 2, 1989

INVENTOR(S) : D. J. Blankenship et al.

It is certified that error appears in the above-identified patent and that said Letters Patent is hereby corrected as shown below:

Abstract line 19, "configuration" (1st) should be --configurations--

Col. 1, line 11, "pluraltiy" should be --plurality--

Col. 1, line 13, "disclose" should be --discloses--

Col. 1, line 38, "crossmembers" should be --cross members--

Col. 2, line 3b, "releasable" should be --releasably--

Col. 2, line 42, "include" should be --includes--

Col. 2, line 43, "portions" should be --portion--

Figure 4:
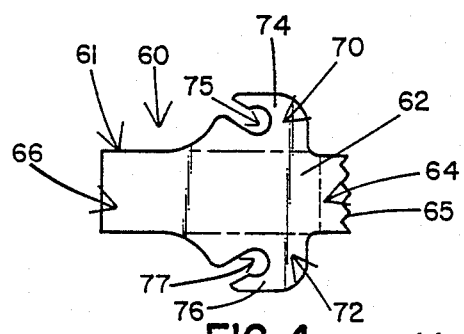
FIG. 4 is a top view of a metal stamping which can be deformed to form part of either end of the releasable connector mechanism.

Col. 5, line 41, after "respecitvely" insert --Referring now to Fig. 4, the metal stamping 60 is a--

Col. 5, line 42, after "62" change the period to a comma

Col. 5, line 63, Col. 6, lines 22 and 24, "for" should be --from--

UNITED STATES PATENT AND TRADEMARK OFFICE
CERTIFICATE OF CORRECTION

PATENT NO. : 4,825,923

DATED : May 2, 1989

INVENTOR(S) : D. J. Blankenship et al.

It is certified that error appears in the above-identified patent and that said Letters Patent is hereby corrected as shown below:

Col. 8, line 8, "desireable" should be --desirable--

Col. 10, line 25, "sized" should be --size--

Col. 10, line 58, "exists" should be --exists--

Col. 11, line 16, after "comprising" insert --a--

Col. 11, line 22, "binding" should be --binder--

Signed and Sealed this

Twelfth Day of November, 1991

Attest:

HARRY F. MANBECK, JR.

*Attesting Officer*         *Commissioner of Patents and Trademarks*